(12) United States Patent
Snuggerud

(10) Patent No.: US 11,631,503 B2
(45) Date of Patent: Apr. 18, 2023

(54) CONTROL ROD DAMPING SYSTEM

(71) Applicant: NuScale Power, LLC, Portland, OR (US)

(72) Inventor: Ross Douglas Snuggerud, Corvallis, KS (US)

(73) Assignee: NuScale Power, LLC, Corvallis, OR (US)

( * ) Notice: Subject to any disclaimer, the term of this patent is extended or adjusted under 35 U.S.C. 154(b) by 0 days.

(21) Appl. No.: 17/246,251

(22) Filed: Apr. 30, 2021

(65) Prior Publication Data

US 2021/0398695 A1 Dec. 23, 2021

Related U.S. Application Data

(63) Continuation of application No. 15/858,073, filed on Dec. 29, 2017, now Pat. No. 11,024,433.

(Continued)

(51) Int. Cl.
*G21C 7/20* (2006.01)
*G21C 7/11* (2006.01)
(Continued)

(52) U.S. Cl.
CPC ............... *G21C 7/20* (2013.01); *G21C 3/322* (2013.01); *G21C 7/11* (2013.01); *G21C 7/117* (2013.01);
(Continued)

(58) Field of Classification Search
CPC ... G21C 7/10; G21C 7/14; G21C 7/20; G21C 7/12; G21C 15/24; G21C 15/26
(Continued)

(56) References Cited

U.S. PATENT DOCUMENTS

| 65,169 A | 5/1867 | Card |
| 1,159,262 A | 11/1915 | Ottum |

(Continued)

FOREIGN PATENT DOCUMENTS

| CN | 102881340 A | 9/2012 |
| CN | 102737736 A | 10/2012 |

(Continued)

OTHER PUBLICATIONS

International Search Report and Written Opinion for PCT Application No. PCT/US2017/068397 dated Mar. 12, 2018. 14 pages.

(Continued)

*Primary Examiner* — Jack W Keith
*Assistant Examiner* — Joshua C Devorkin
(74) *Attorney, Agent, or Firm* — Perkins Coie LLP

(57) ABSTRACT

A damping area or "dash pot" on the upper ends of control rods absorb energy from dropped control rod assemblies without narrowing the diameter of guide tubes. As a result, coolant can freely flow through the guide tubes reducing boiling water issues. The dampening area reduces a separation distance between an outside surface of the control rod and an inside surface of the guide tubes decelerating the control rods when entering a top end of the guide tubes. In another example, the dampening area may be located on a drive shaft. The dampening area may have a larger diameter than an opening in a drive shaft support member that decelerates the drive shaft when dropped by a drive mechanism.

17 Claims, 9 Drawing Sheets

Related U.S. Application Data

(60) Provisional application No. 62/441,038, filed on Dec. 30, 2016.

(51) Int. Cl.
 *G21C 7/117* (2006.01)
 *G21C 3/322* (2006.01)
 *G21C 3/33* (2006.01)
 *G21C 9/02* (2006.01)

(52) U.S. Cl.
 CPC ............ *G21C 3/3315* (2013.01); *G21C 9/02* (2013.01); *Y02E 30/30* (2013.01)

(58) Field of Classification Search
 USPC .................................................. 376/225, 234
 See application file for complete search history.

(56) References Cited

U.S. PATENT DOCUMENTS

| | | |
|---|---|---|
| 1,580,352 A | 4/1926 | Ventresca |
| 1,897,561 A | 2/1933 | Manucci |
| 2,179,594 A | 6/1938 | Johnson |
| 2,445,106 A | 2/1946 | Dempster |
| 2,518,621 A | 8/1950 | Hull et al. |
| 2,894,779 A | 7/1959 | Kushner |
| 2,961,393 A | 11/1960 | Monson |
| 2,968,205 A | 1/1961 | Springate |
| 3,036,964 A | 5/1962 | Horning |
| 3,038,847 A | 6/1962 | Hartin |
| 3,107,209 A | 10/1963 | Frisch |
| 3,346,549 A | 7/1966 | Prince et al. |
| 3,595,748 A | 1/1968 | Frische et al. |
| 3,597,939 A | 8/1971 | Ripley et al. |
| 3,625,816 A | 12/1971 | Aleite |
| 3,734,825 A | 5/1973 | Schabert |
| 3,796,890 A | 3/1974 | Thompson et al. |
| 3,929,305 A | 12/1975 | Sabol |
| 3,933,581 A | 1/1976 | McKeehan |
| 3,935,063 A | 1/1976 | Dunckel |
| 3,992,255 A | 11/1976 | DeWesse |
| 4,054,486 A | 10/1977 | Lefebvre et al. |
| 4,120,172 A | 10/1978 | Pierce |
| 4,134,789 A | 1/1979 | Aubert |
| 4,147,589 A | 4/1979 | Roman et al. |
| 4,338,647 A | 7/1982 | Wilson et al. |
| 4,437,054 A | 5/1984 | Veronesi |
| 4,472,348 A | 9/1984 | Desfontaines |
| 4,481,164 A | 11/1984 | Bollinger |
| 4,484,093 A | 11/1984 | Smith |
| 4,544,521 A | 10/1985 | Millot |
| 4,681,728 A | 7/1987 | Veronesi |
| 4,696,786 A | 9/1987 | Frizot |
| 4,716,013 A | 12/1987 | Veronesi |
| 4,747,994 A | 5/1988 | Hager et al. |
| 4,786,885 A | 11/1988 | Morris et al. |
| 4,851,183 A | 7/1989 | Hampel |
| 4,859,404 A | 8/1989 | Richart |
| 4,921,041 A | 5/1990 | Akachi |
| 5,253,702 A | 10/1993 | Davidson et al. |
| 5,466,114 A | 11/1995 | Swain |
| 5,669,729 A | 9/1997 | Attix |
| 5,682,287 A | 10/1997 | Pollman et al. |
| 5,711,629 A | 1/1998 | Attix |
| 5,761,260 A | 6/1998 | Bergamashi |
| 6,266,386 B1 | 7/2001 | Patel |
| 6,275,556 B1 | 8/2001 | Kinney |
| 6,327,322 B1 | 12/2001 | Burton |
| 6,718,001 B2 | 4/2004 | Hidaka et al. |
| 6,810,099 B2 | 10/2004 | Nakamura et al. |
| 9,865,365 B2 | 1/2018 | Bang et al. |
| 11,024,433 B2 | 6/2021 | Snuggerud |
| 2003/0205938 A1 | 11/2003 | Andarawis et al. |
| 2004/0136487 A1 | 7/2004 | Shin et al. |
| 2005/0077660 A1 | 4/2005 | Mucciardi et al. |
| 2006/0066104 A1 | 3/2006 | Melfi |
| 2009/0252272 A1 | 10/2009 | Hashemian et al. |
| 2010/0068464 A1 | 3/2010 | Meyer |
| 2011/0222640 A1 | 9/2011 | DeSantis |
| 2012/0148005 A1 | 6/2012 | Fujimoto et al. |
| 2012/0148007 A1 | 6/2012 | Allen |
| 2013/0223579 A1 | 8/2013 | Allen |
| 2013/0235968 A1 | 9/2013 | Young et al. |
| 2013/0272464 A1 | 10/2013 | Walton et al. |
| 2014/0169514 A1 | 6/2014 | Lemm et al. |
| 2015/0325318 A1 | 11/2015 | Singh |
| 2016/0012924 A1 | 1/2016 | McClure et al. |
| 2016/0217578 A1 | 7/2016 | Can et al. |
| 2016/0232996 A1 | 8/2016 | Liszkai |
| 2017/0117063 A1 | 4/2017 | Keller et al. |
| 2018/0019027 A1 | 1/2018 | Morgan et al. |

FOREIGN PATENT DOCUMENTS

| | | | |
|---|---|---|---|
| CN | 103971760 | * | 8/2014 |
| CN | 103971760 A | | 8/2014 |
| EP | 225511 A2 | | 6/1987 |
| EP | 811990 A1 | | 12/1997 |
| EP | 781451 B1 | | 12/2001 |
| EP | 1939890 A2 | | 7/2008 |
| FR | 2677164 A1 | | 12/1992 |
| FR | 2749435 A1 | | 12/1997 |
| JP | S55104795 A | | 8/1980 |
| JP | S57158592 A | | 9/1982 |
| JP | S58127385 U | | 8/1983 |
| JP | S6383693 A | | 4/1988 |
| JP | H05256978 A | | 10/1993 |
| JP | H07140287 A | | 6/1995 |
| JP | 2001099974 A | | 4/2001 |
| JP | 2002333494 A | | 11/2002 |
| JP | 2010145280 A | | 7/2010 |
| JP | 2012122907 A | | 6/2012 |
| KR | 20010055075 A | | 7/2001 |
| KR | 200453164 Y1 | | 4/2011 |
| WO | 2012078941 A1 | | 6/2012 |

OTHER PUBLICATIONS

International Preliminary Report on Patentability for PCT Application No. PCT/US2017/068397 dated Jul. 11, 2019. 8 pages.

ISA, International Search Report and Written Opinion for International Application No. PCT/US2017/069034. dated Sep. 26, 2018. 10 pages.

Isa, International Search Report and Written Opinion for International Application No. PCT/US2018/067128. dated Jun. 3, 2019. 9 pages.

Mason, NASA Kilopower Overview and Mission Applications (NASA Presentation, Las Vegas, Jan. 18, 2018); 18 pages.

Westinghouse eVinciTM Micro Reactor (www.westinghousenuclear.com/New-Plants/eVinci-Micro-Reactor); Westinghouse Global Technology Office; Oct. 2017; 2 pages.

Wikipedia, "Heat Pipe" downloaded Feb. 26, 2018; 14 pages.

ISA, International Search Report and Written Opinion for PCT Application No. PCT/US2014/062105. dated Mar. 13, 2015. 10 pages.

ISA, International Search Report and Written Opinion for PCT Application No. PCT/US2014/072229. dated Sep. 24, 2015. 7 pages.

* cited by examiner

CONTROL ROD DAMPING SYSTEM

CROSS-REFERENCE TO RELATED APPLICATION(S)

This application is a continuation of U.S. patent application Ser. No. 15/858,073, filed on Dec. 29, 2017, and titled "CONTROL ROD DAMPING SYSTEM," which claims priority to U.S. Provisional Patent Application No. 62/441,038, filed on Dec. 30, 2016 and titled "CONTROL ROD DASH POT INTEGRAL TO THE UPPER TIE PLATE," the contents of each of which are herein incorporated by reference in their entirety.

STATEMENT REGARDING FEDERALLY SPONSORED RESEARCH

This invention was made with Government support under Contract No. DE-NE0000633 awarded by the Department of Energy. The Government has certain rights in this invention.

TECHNICAL FIELD

This disclosure generally relates to a control rod damping system.

BACKGROUND

Dash pots constrict diameters near the bottom of the guide tubes slowing the fall of control rods during a scram to reduce potential impact damage. Low coolant flow through nuclear reactor guide tubes can lead to problems such as boiling, reduced fuel economy, and potential interference with control rode operations due to build-up of guide tube corrosion and precipitates. One potential cause of low coolant flow are the dash pots.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A damping area or "dash pot" on the upper ends of control rods reduce the need to constrict the diameter of guide tubes. As a result, water can more freely flow through the guide tubes reducing boiling coolant issues. The restriction at the upper portion of the control rod assembly creates hydraulic back pressure which slows the fall and associated impact of the control rods hitting the fuel assembly during a scram procedure.

The control rods include a first section having a first diameter retaining an active material for inserting into the guide tube and controlling a fission rate in a nuclear reactor core. A second section of the control rods attach to a head assembly. The novel dampening section is located between the first and second section with a second larger diameter. The dampening section reduces a separation distance between an outside surface of the control rod and an inside surface of the guide tube that decelerates the control rod when entering a top end of the guide tube.

In one example, the control rod may have a cylindrical cladding including a bottom end retaining the active material and having a first wall thickness. A top end of the cladding may have a second continuously increasing wall thickness larger than the first wall thickness.

In another example, the dampening area may be located on a drive shaft. The drive shaft may slidingly extend through an opening in a support member. The drive shaft may include a dampening section having a diameter larger than the opening in the support member to decelerate the drive shaft when dropped by a rod drive mechanism.

Figure 1:
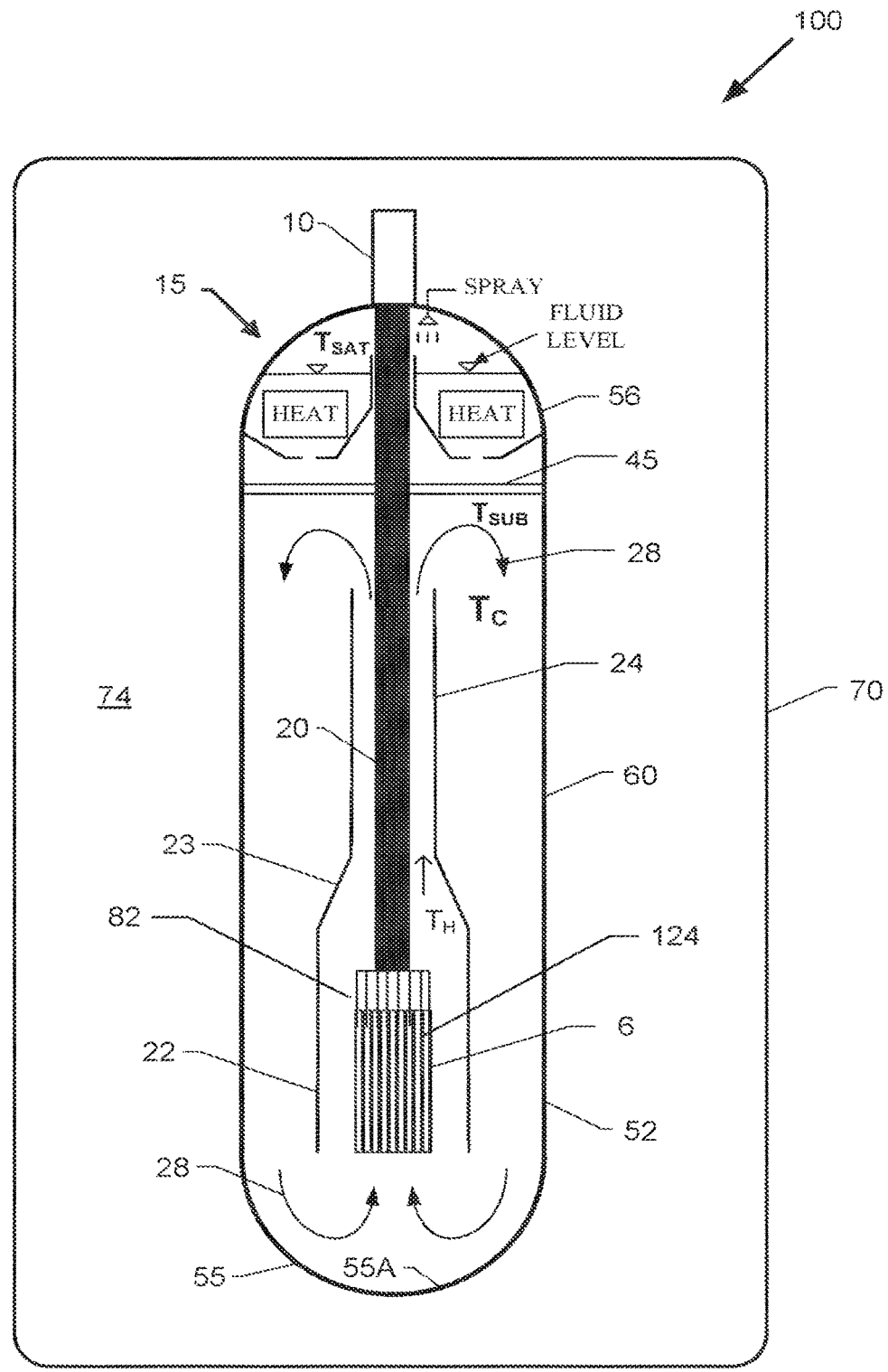
FIG. 1 shows a schematic diagram of an example power module.

FIG. 1 illustrates a cross-sectional view of an example reactor module 100 comprising reactor pressure vessel 52. Reactor core 6 is shown located near a lower head 55 of the reactor pressure vessel 52. The reactor core 6 may be located in a shroud 22 which surrounds reactor core 6 about its sides. A riser section 24 is located above the reactor core 6.

When primary coolant 28 is heated by reactor core 6 as a result of fission events, primary coolant 28 may be directed from shroud 22 up into an annulus 23 located above reactor core 6, and out of riser 24. This may result in additional primary coolant 28 being drawn into shroud 22 to be heated in turn by reactor core 6, which draws yet more primary coolant 28 into shroud 22. The primary coolant 28 that emerges from riser 24 may be cooled down and directed towards the outside of the reactor pressure vessel 52 and then returned to the bottom of the reactor pressure vessel 52 through natural circulation.

Primary coolant 28 circulates past the reactor core 6 to become high-temperature coolant TH and then continues up through the riser section 24 where it is directed back down the annulus and cooled off by a heat exchanger to become low-temperature coolant TC. One or more control rod drive mechanisms (CRDM) 10 operably coupled to a number of drive shafts 20 may be configured to interface with a plurality of control rod assemblies 82 located above reactor core 6.

A reactor pressure vessel baffle plate 45 may be configured to direct the primary coolant 28 towards a lower end 55 of the reactor pressure vessel 52. A surface of the reactor pressure vessel baffle plate 45 may come into direct contact with and deflect the primary coolant 28 that exits the riser section 24. In some examples, the reactor pressure vessel baffle plate 45 may be made of stainless steel or other materials.

The lower end 55 of the reactor pressure vessel 52 may comprise an ellipsoidal, domed, concave, or hemispherical portion 55A, wherein the ellipsoidal portion 55A directs the primary coolant 28 towards the reactor core 6. The ellipsoidal portion 55A may increase flow rate and promote natural circulation of the primary coolant through the reactor core 6.

Further optimization of the coolant flow 28 may be obtained by modifying a radius of curvature of the reactor pressure vessel baffle plate 45 to eliminate/minimize boundary layer separation and stagnation regions.

The reactor pressure vessel baffle plate 45 is illustrated as being located between the top of the riser section 24 and a pressurizer region 15. The pressurizer region 15 is shown as comprising one or more heaters and a spray nozzle configured to control a pressure, or maintain a steam dome, within an upper end 56 or head of the reactor pressure vessel 52. Primary coolant 28 located below the reactor pressure vessel baffle plate 45 may comprise relatively sub-cooled coolant TSUB, whereas primary coolant 28 in the pressurizer region 15 in the upper end 56 of the reactor pressure vessel 52 may comprise substantially saturated coolant TSAT.

A fluid level of primary coolant 28 is shown as being above the reactor pressure vessel baffle plate 45, and within the pressurizer region 15, such that the entire volume between the reactor pressure vessel baffle plate 45 and the lower end 55 of the reactor pressure vessel 52 may be full of primary coolant 28 during normal operation of the reactor module 100.

Shroud 22 may support one or more control rod guide tubes 124. The one or more control rod guide tubes 124 serve to guide control rod assemblies 82 that are inserted into, or removed from, reactor core 6. In some examples, control rod drive shafts 20 may pass through reactor pressure vessel baffle plate 45 and through riser section 24 in order to control the position of control rod assemblies 82 relative to reactor core 6.

Reactor pressure vessel 52 may comprise a flange by which lower head 55 may be removably attached to a vessel body 60 of reactor pressure vessel 52. In some examples, when lower head 55 is separated from vessel body 60, such as during a refueling operation, riser section 24, baffle plate 45, and other internals may be retained within vessel body 60, whereas reactor core 6 may be retained within lower head 55.

Additionally, vessel body 60 may be housed within a containment vessel 70. Any air or other gases that reside in a containment region 74 located between containment vessel 70 and reactor pressure vessel 52 may be removed or voided prior to or during reactor startup. The gases that are voided or evacuated from the containment region 74 may comprise non-condensable gases and/or condensable gases. Condensable gases may include steam that is vented into containment region 74.

During an emergency operation, vapor and/or steam may be vented into containment region 74, only a negligible amount of non-condensable gas (such as hydrogen) may be vented or released into containment region 74.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 54, the amount of hydrogen and oxygen that is allowed to mix may be minimized or eliminated.

It may be possible to assume from a practical standpoint, that substantially no non-condensable gases are released into or otherwise housed in containment region 74 during operation of reactor module 100. Accordingly, in some examples, substantially no hydrogen gas is present in the containment region 74, such that the levels and/or amounts of hydrogen together with any oxygen that may exist within the containment region 74 are maintained at a non-combustible level. Additionally, this non-combustible level of oxygen-hydrogen mixture may be maintained without the use of hydrogen recombiners. In some examples, separate vent lines from the reactor pressure vessel 52 may be configured to remove non-condensable gases during start up, heat up, cool down, and/or shut down of the reactor.

During the emergency scram condition, drive assemblies 10 may release drive shafts 20 dropping control rod assemblies 82 into guide tubes 124. Conventional guide tubes 124 may narrow toward bottom ends to hydraulically dampen the impact of control rod assemblies 82 dropping into reactor core 6. As described above, the narrow bottom diameters of guide tubes 124 may reduce the flow of primary coolant 28 through reactor core 6 causing coolant 28 to boil resulting in corrosion and reduced fuel economy.

Control Rod Dampening System

Figure 2:
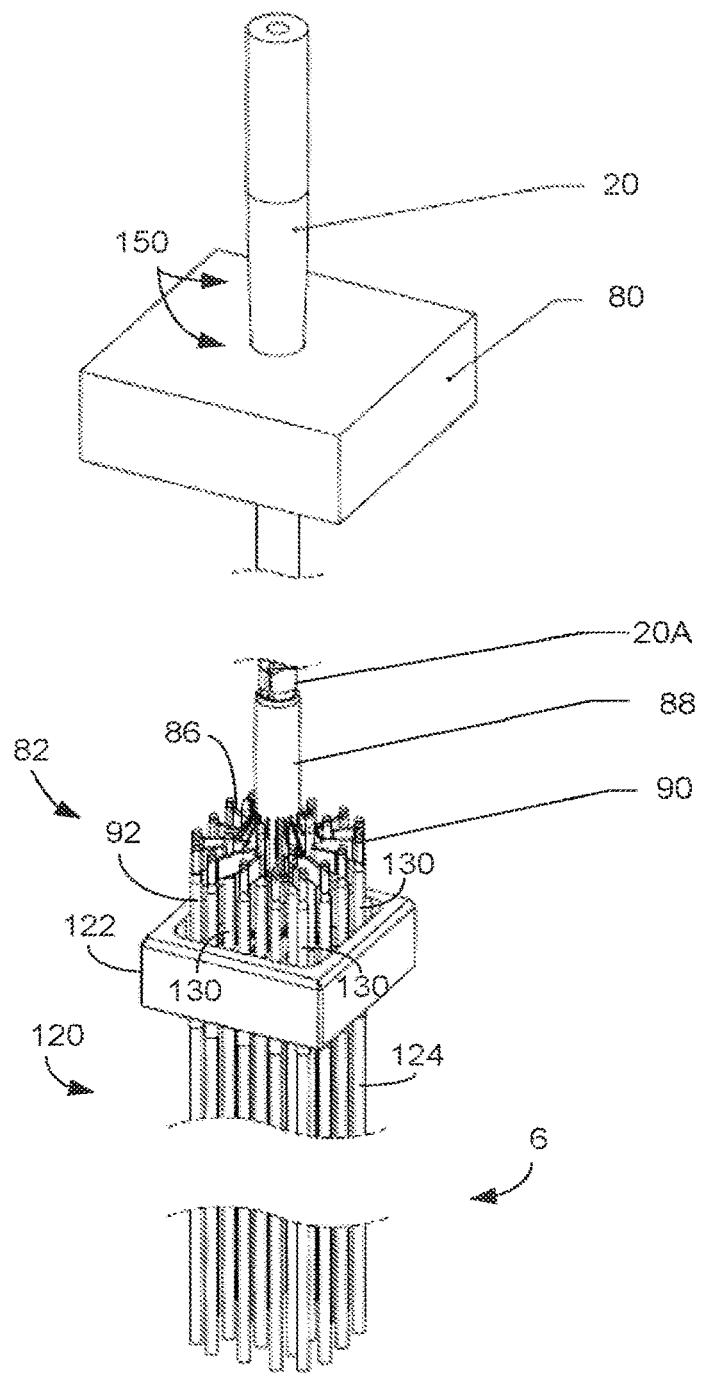
FIG. 2 is a perspective view of a drive shaft and control rod assembly.

FIG. 2 is a perspective view of a control rod assembly 82 that includes dampening areas 130. Control rod assembly 82 may be held above and then inserted into reactor core 6. As explained above in FIG. 1, multiple drive shafts 20 extend from rod drive mechanisms 10, through baffle plate 45 and shroud 22 down to the top of reactor core 6. In one example, drive shafts 20 extend through a drive shaft support 122 that may be part of baffle plate 45 described above in FIG. 1. However, drive shaft support 80 may be located and attached anywhere within reactor pressure vessel 52, such on shroud 22, annulus 23 or riser section 24.

A head assembly 86 may include a cylinder 88 that attaches to the bottom end of drive shaft 20. Head assembly 86 also may include arms 90 that extend radially out from cylinder 86 and attach at distal ends to top ends of control rods 92. Head assembly 86 is alternatively referred to a spider machining and control rods 92 are alternatively referred to as fingers.

Control rods 92 extend into a fuel assembly 120 that is alternatively referred to as a fuel bundle and in FIG. 1 forms part of reactor core 6. Fuel assembly 120 may include a top nozzle 122 that supports multiple guide tubes 124. Guide tubes 124 extend down from nozzle 122 and in-between nuclear fuel rods (not shown). Control rods 92 control the fission rate of uranium and plutonium fuel rods.

Control rods 92 are typically held by drive shaft 20 above fuel assembly 120 or held slightly inserted into fuel assembly 120. Reactor core 6 may overheat. A nuclear scram operation is initiated where rod drive mechanisms 10 in FIG. 1 release drive shafts 20 dropping control rods 92 down into guide tubes 124 and in-between the fuel rods. Some fuel assemblies narrow bottom ends of guide tubes 124 to reduce the impact of control rod assembly 82 slamming into fuel assembly 120.

As explained above, these narrow diameters at the bottom ends of guide tubes restrict coolant flow causing steam created corrosion. Negative effects of low coolant flow can be even more detrimental in a nuclear reactor, such as nuclear reactor module 100 that may use natural circulation, instead of pumps, to circulate coolant through guide tubes 124.

Dampening areas 130 are integrated into the upper ends of control rods 92 to reduce the impact of dropping control rod assembly 82 onto fuel assembly 120 during a scram operation. Instead of continuously restricting coolant flow through the bottom ends of guide tubes 124, dampening areas 130 only restrict coolant flow at the upper ends of guide tubes 124 during the scram operation. In addition, coolant flow is only restricted after control rods 92 are mostly inserted into guide tubes 124. In another example, dampening areas 150 are located on drive shafts 20 moving impact forces even further above control rod assembly 82 and fuel assembly 120.

Figure 3:
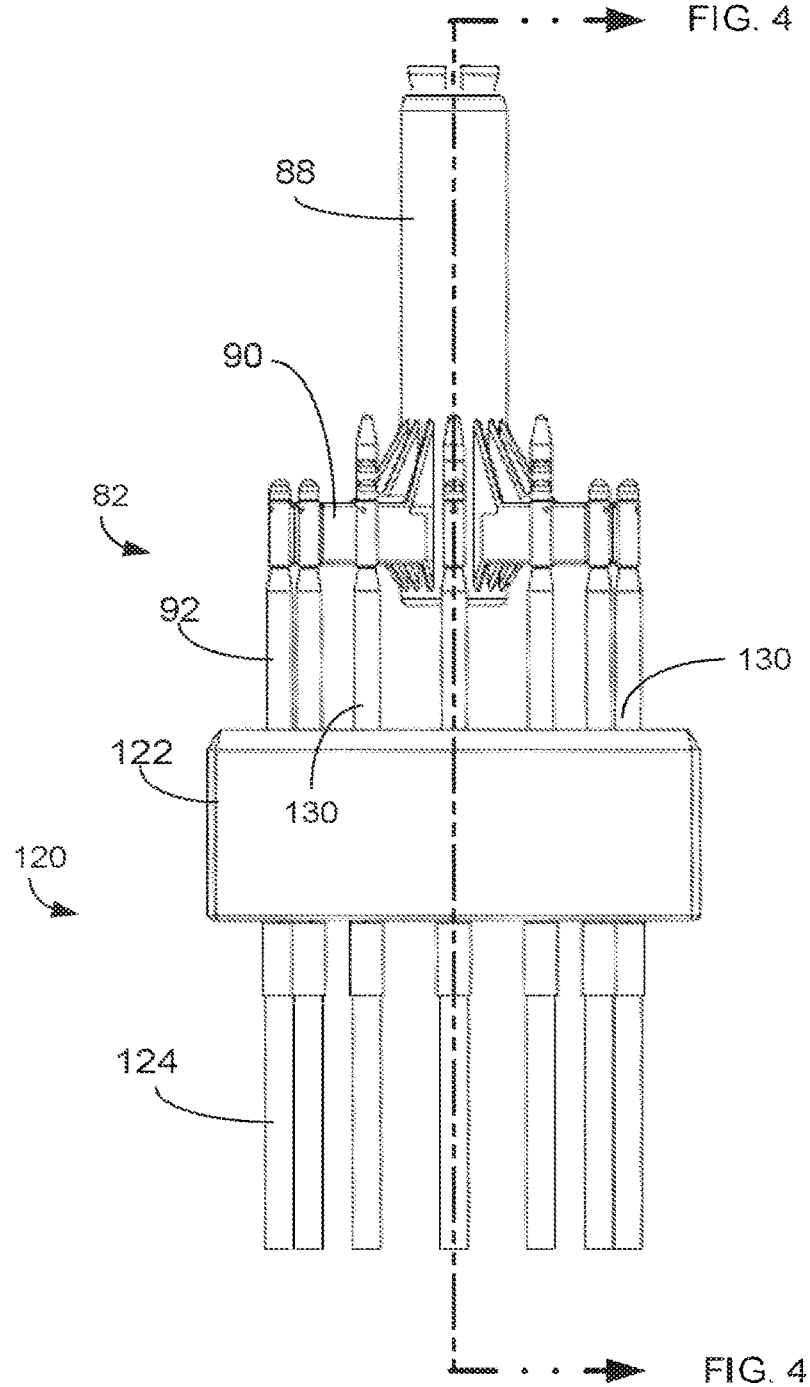
FIG. 3 is a side view of the control rod assembly partially inserted into a fuel assembly.
Figure 4:
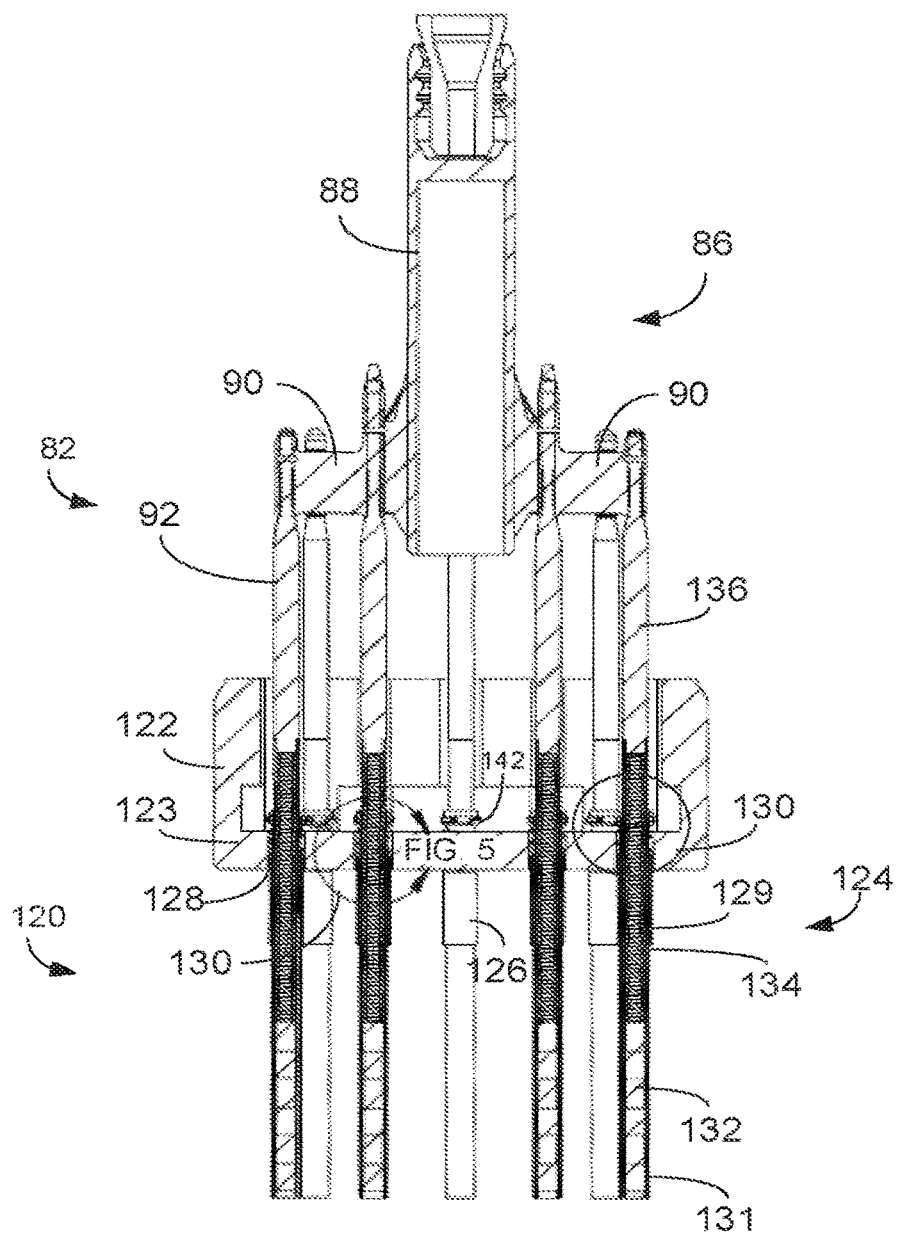
FIG. 4 is a side sectional view of the control rod assembly and fuel assembly.
Figure 5:
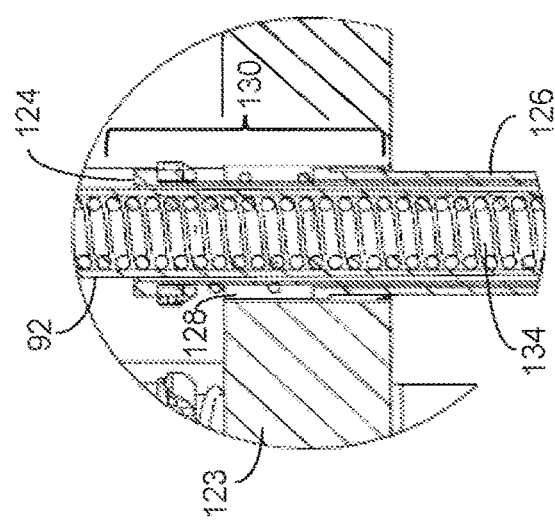
FIG. 5 is an enlarged detail side sectional view of a control rod dampening section.

FIG. 3 is a side view and FIG. 4 is a side sectional view of control rod assembly 82 and fuel assembly 120. FIG. 5 is a more detailed side sectional view for a portion of control rod 92 that includes dampening area 130. Referring to FIGS. 3-5, guide tube sleeves 126 extend downward from substantially the middle of holes 128 formed in floor 123 of nozzle 122. Guide tubes 124 extend from a top surface of floor 123 through holes 128 and sleeves 126 down in between fuel rods of the reactor core.

Control rods 92 each include a top plug section 136, an intermediate section 129 that holds a spring 134, and a bottom section 131 that holds active control rod material 132. Active material 132 is used in reactor core 6 of FIG. 1 to control the fission rate of uranium and plutonium. At least in some examples, active material 132 may include chemical elements such as boron, silver, indium and cadmium that are capable of absorbing neutrons without themselves fissioning.

Each control rod 92 extends down from head assembly 86 into the top end of an associated guide tube 124. In a fully inserted position, control rods 92 extend through nozzle 122 and down to the bottom of guide tubes 124 in between the fuel rods. Control rods 92 are normally held by drive shaft 20 above nozzle 122 and are typically not completely inserted into fuel assembly 126 unless an overheating condition is detected.

Dampening area 130 is located in the top ends of intermediate sections 129 between plug 136 and above active material 132 where spring 134 is located. As explained in more detail below, dampening area 130 reduces the impact when control rods 92 are dropped into guide tubes 124 during a nuclear scram. In one example, the diameters of control rods 92 in dampening area 130 are larger than the diameters of the lower sections 131 that extend down into fuel assembly 120. This allows substantially the entire lower section 131 carrying active material 132 to fully insert in between the fuel rods prior to dampening area 130 reaching the top ends of guide tubes 124.

Figure 6:
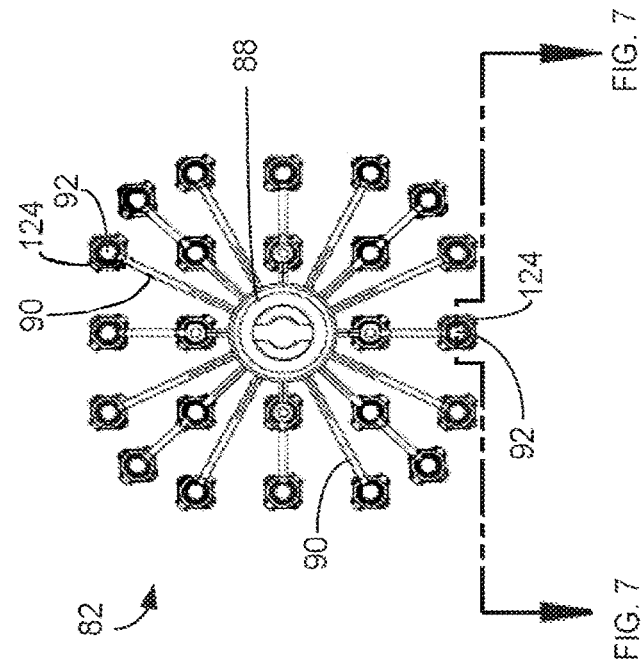
FIG. 6 is a top sectional view of the control rod assembly.
Figure 7:
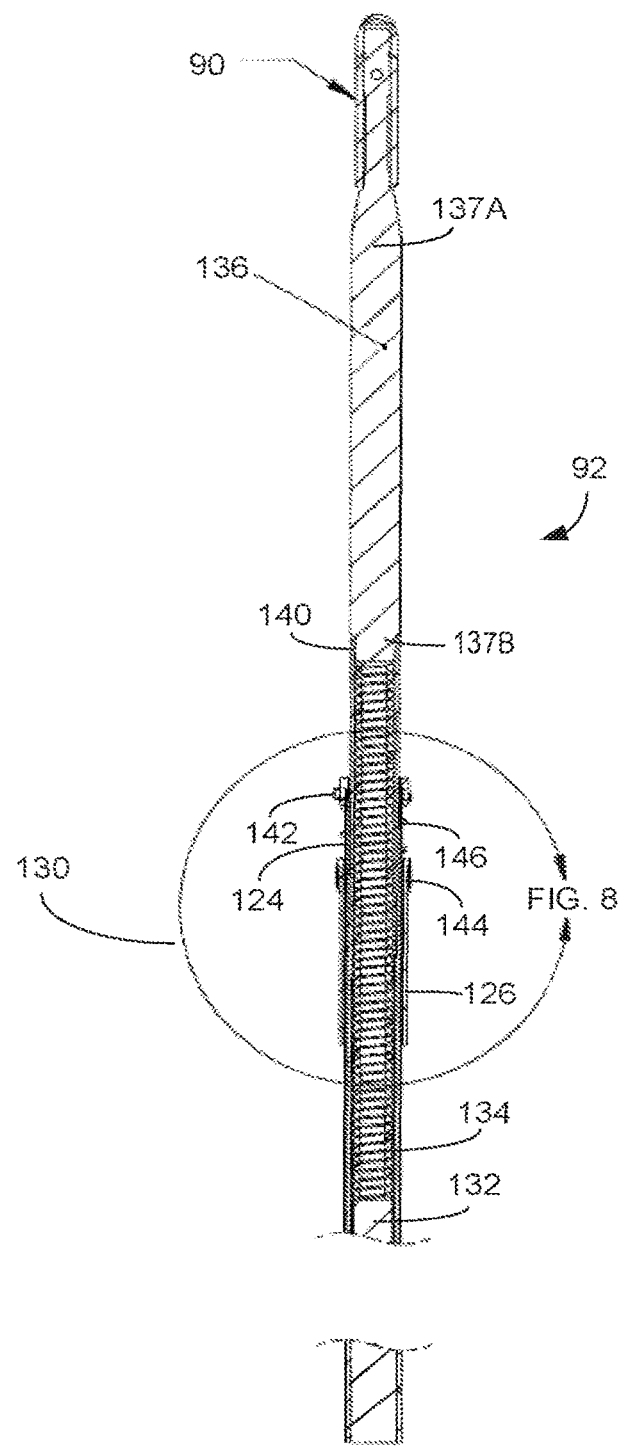
FIG. 7 is a side sectional view of the dampening section of the control rod inserting into an associated guide tube.
Figure 8:
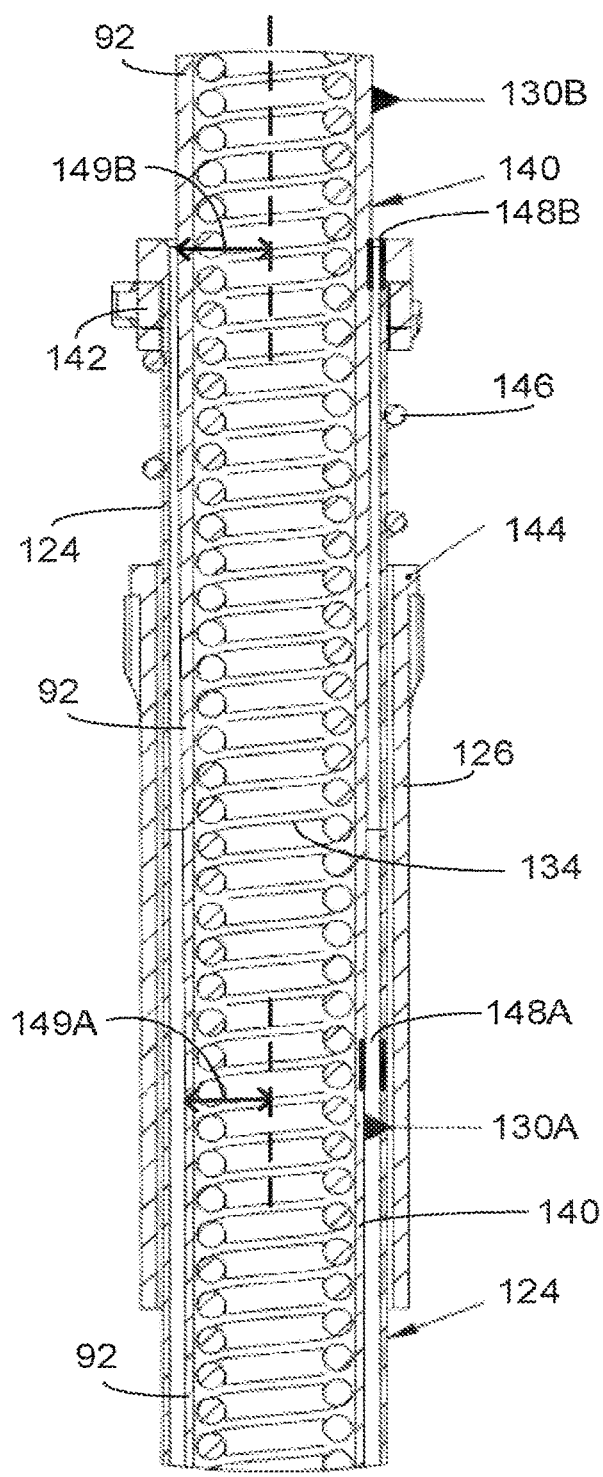
FIG. 8 is a further enlarged detail side sectional view of the control rod dampening section.

FIG. 6 is a top sectional view of control rod assembly 82 and guide tubes 124. FIG. 7 is a side sectional view of a control rod 92 partially inserted into an associated guide tube 124. FIG. 8 is a further enlarged detailed side sectional view of dampening area 130 formed in control rod 92.

Referring first to FIGS. 4, 6 and 7, as explained above, plug 136 of control rod 92 includes a top end 137A that inserts into the bottom end of arm 90 on head assembly 86 and a bottom end 137B that inserts into a cylindrical cladding 140. In one example, cladding 140 has a circular cross-sectional shape that retains spring 134 and active material 132. In one example, cladding 140 may be made out of stainless steel.

A guide tube collar 142 extends up from floor 123 of nozzle 122 as shown in FIG. 4. Guide tube 124 extends down from collar 142 through floor 123 of nozzle 122 and down to the bottom of fuel assembly 120. A sleeve collar 144 sits in hole 128 of nozzle 122 as shown in FIG. 4. Sleeve 126 extends down from collar 144 below floor 123 of nozzle 122. A spring 146 extends around the outside surface of guide tube 124 between collar 142 and collar 144.

Referring now to FIG. 8, a wall thickness and an associated outside diameter of cladding 140 may continuously increase from a lower dampening location 130A to an upper dampening location 130B. This increased wall thickness and corresponding increased diameter reduces a spacing 148 between the outside surface of cladding 140 and an inside surface of guide tube 124. For example, space 148A between cladding 140 and guide tube 124 at dampening location 130A is larger than space 148b between the outside surface of cladding 140 and the inside surface of guide tube 124 at upper dampening location 130B.

Referring to FIGS. 1-8, during normal operations, drive shaft 20 may hold control rods 92 almost completely above fuel assembly 120. During an overheating condition, rod drive mechanisms 10 in FIG. 1 release drive shafts 20 dropping control rod assembly 82. The lower sections 131 of controls rods 92 that contain active material 132 have a uniform smaller diameter and accordingly drop freely down into guide tubes 124. Control rods 92 may push coolant out the top and bottom ends of guide tubes 124.

Control rods 92 continue to drop freely until bottom ends 130A of dampening area 130 reach the top ends of guide tubes 124. The continuously increasing diameter of dampening area 130 start reducing the spacing 148 at the top ends of guide tubes 124 between the outside surface of control rods 92 and the inside surfaces of guide tubes 124.

Dampening area 130 starts restricting the coolant from escaping through the top ends of guide tubes 124. The restricted coolant creates a back hydraulic pressure that slows down and absorbs some of the energy from the control rods 92 falling inside of guide tubes 124. As a result, the coolant in guide tubes 124 acts like a hydraulic cylinder decelerating the falling speed of control rod assembly 82.

One substantial advantage of using larger diameter dampening section 130 is that guide tubes 124 may remain at a consistent diameter throughout the entire length of fuel assembly 120. Thus, guide tubes 126 may avoid creating the boiling and corrosion problems that exist in guide tubes with narrow diameter bottom ends.

Wider dampening areas 130 also may be easier to manufacture compared with changing a diameter at the bottom of guide tubes 124. Wider dampening areas 130 also may stiffen the upper ends of control rods 92 and reduce binding when control rods 92 are dropped into guide tubes 124.

In one example, a bottom outside diameter 149A at damping location 130A may be around 9.677 millimeters (mms), lower spacing 148A may be around 0.866 mms, upper outside diameter 149B at dampening location 130B may be around 10.668 mms, upper spacing 148B may be around 0.375 mms, and the distance between lower dampening location 130A and upper dampening location 130B may be around 85 mms.

The spacings, diameters, and distances of dampening area 130 may vary based on the size and weight of control rod assembly 82. The dimensions of dampening area 130 can also be varied to provide a more gradual deceleration of control rod assembly 82. For example, the length between lower dampening location 130A and upper dampening location 130b may be increased to provide a more gradual deceleration of control rod assembly 82. In another example, holes may be drilled through the top ends of guide tubes 124 to provide an alternative coolant escape path.

In another example, cladding 140 may remain at a same uniform thickness. However, outside diameter 149A of cladding 140 still may continuously increase from lower dampening location 130A to upper dampening location 130B. For example, an extrusion process used for forming cladding 140 may form a continuously increasing diameter within dampening area 130.

In one example, plug 136 of control rod 92 shown in FIG. 7 may have substantially the same larger outside diameter 149B as the upper end of cladding 140. In another example, cladding 140 may maintain substantially the same diameter 149 and fully extend into guide tubes 124. Dampening area 130 may be formed in plug 136 and have a continuously increasing outside diameter starting from bottom end 137B and extending up to upper end 137A. The diameter at upper end 137A may be sized so arms 90 do not fall on top of nozzle 122 when control rods 92 are released during the scram.

In yet another example, V-shaped slots may extend up from floor 123 of nozzle 122. The slots may receive arms 90 and decelerate and stop control rod assembly 82 before slamming into the top of fuel assembly 120.

Figure 9:
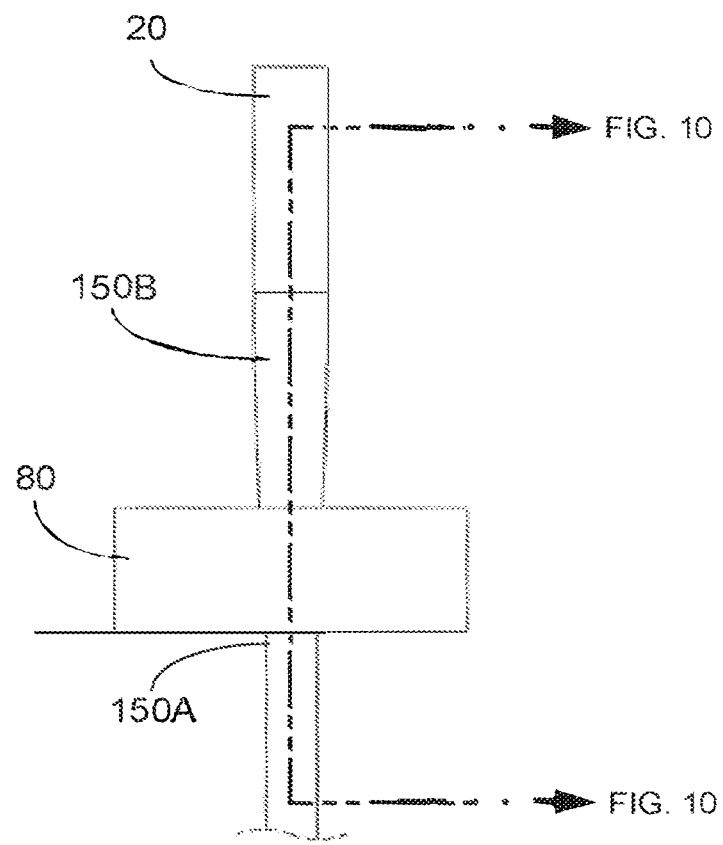
FIG. 9 is a side view of a dampening area located on a drive shaft.
Figure 9:
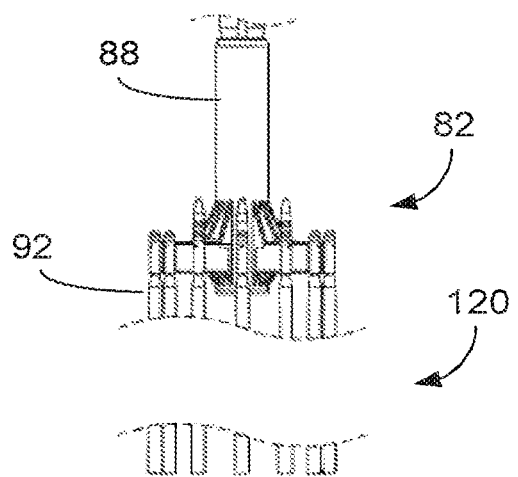
Figure 10:
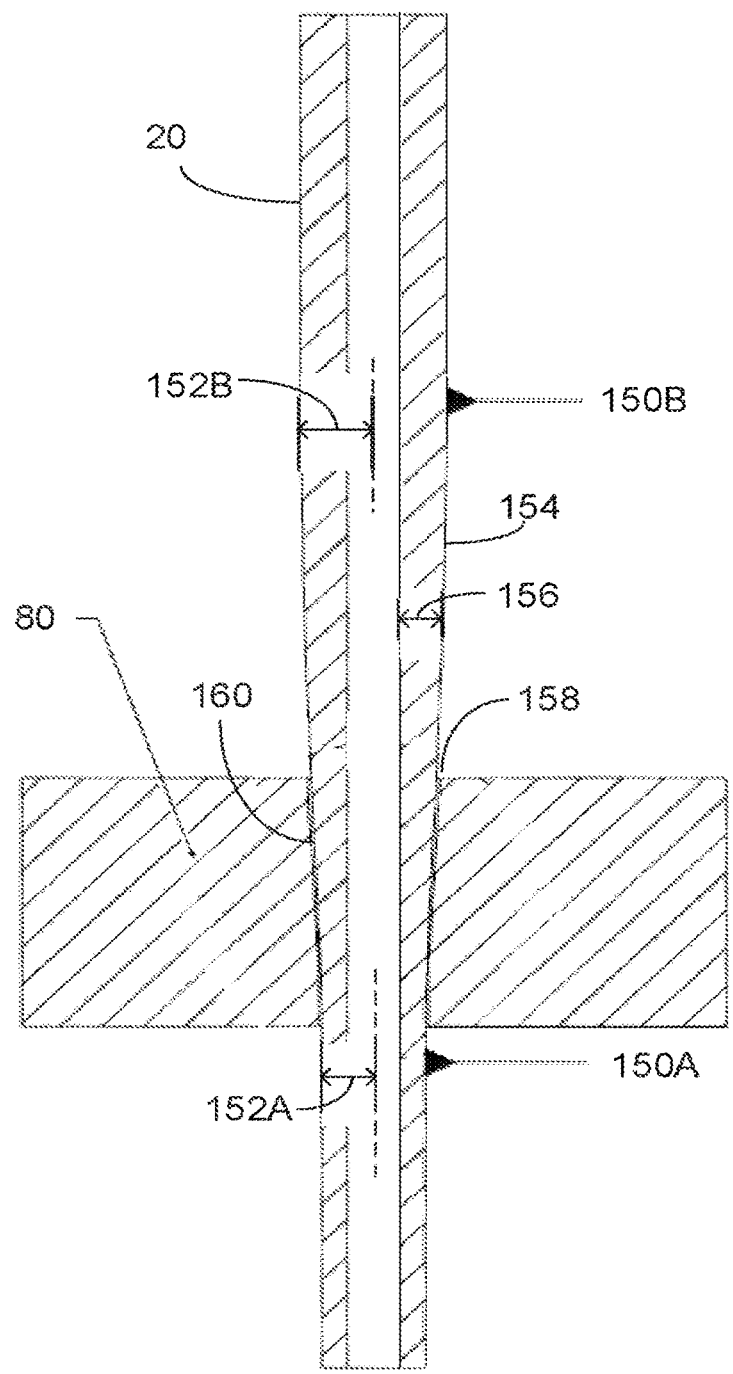
FIG. 10 is a sectional view of the dampening area of FIG. 9.

FIG. 9 is a side view of drive shaft 20 and control rod assembly 82 shown above in FIG. 2. FIG. 10 is a sectional view of a portion of drive shaft 20 and drive shaft support 80. Referring to FIGS. 9 and 10, drive shafts 20 may be used instead of control rods 92 to dampen the speed of control rod assembly 82 during a nuclear scram.

A lower portion of drive shaft 20 may have a first outside diameter 152A. Lower dampening location 150A may start at first outside diameter 152A and continuously increase until reaching a second larger outside diameter 152B at upper dampening location 150B. Drive shaft 20 may maintain smaller outside diameter 152A below dampening location 150A and may maintain larger outside diameter 152B above upper dampening location 150B.

In one example, the outside diameter of drive shaft 20 is increased by increasing a thickness 156 of drive shaft wall 154. Of course, the outside diameter 152 of drive shaft 20 also may be increased without increasing the thickness 156 of drive shaft wall 154 using known extrusion processes. Drive shaft 20 may have a cylindrical shape and dampening area 150 may have an inverted cone shape.

A circular opening 158 in drive shaft support 80 may be formed with an inclining inverted cone shaped inside wall 160 that receives and retains dampening area 150. A diameter of opening 158 may continuously increase from a bottom side of support 80 to a top side of support 80. Drive shaft 20 below dampening location 150A can slide freely through opening 158 dropping control rod assembly 82 down into fuel assembly 120.

The diameter at the bottom end of opening 158 is smaller than diameter 152B of drive shaft 20 at upper dampening location 150B. Accordingly, drive shaft 20 starts decelerating as the outside surface of dampening area 150 starts sitting against inside wall 160 of support 80.

Dampening area 150 may stop drive shaft 20 before drive rod assembly 82 slams down against the top of nozzle 122. For example, dampening area 150 may stop drive rod 20 just before arms 90 of head assembly 86 reach nozzle 122 as shown in FIG. 5.

Alternative dampening schemes may be used with drive shafts 20. For example, a spring may extend up from the top surface of support 80. A transverse bar or wider outside diameter 152B of drive rod 20 may compress the spring to decelerate and eventually stop drive rod 20. In another example, a cone shaped facet with upwardly inclining sides may extend up from the top surface of support 80 and operate similar to upwardly inclining wall 160 of support 80. In another example, dampening areas 130 in control rods 92 and dampening areas 150 in drive rods 20 may be used in combination to further distribute the impact of falling control rod assembly 82.

Some of the operations described above may be implemented in software and other operations may be implemented in hardware. One or more of the operations, processes, or methods described herein may be performed by an apparatus, device, or system similar to those as described herein and with reference to the illustrated Figures.

It will be apparent to one skilled in the art that the disclosed implementations may be practiced without some or all of the specific details provided. In other instances, certain process or methods have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope.

Having described and illustrated the principles of a preferred embodiment, it should be apparent that the embodiments may be modified in arrangement and detail without departing from such principles. Claim is made to all modifications and variation coming within the spirit and scope of the following claims.

I claim:

1. A control rod for inserting into a guide tube of a nuclear reactor fuel assembly, comprising:
   an upper plug;
   cladding coupled to the upper plug, wherein the cladding comprises a continuous wall defining—
      an intermediate section extending from the upper plug, wherein the intermediate section includes a damping region having an upper damping location and a lower damping location farther from the upper plug than the upper damping location, and wherein a diameter of the damping region decreases from a first diameter at the upper damping location to a second diameter at the lower damping location; and
      a lower section extending downward from the damping region of the intermediate section;
   a neutron-absorbing material positioned in the lower section; and
   a spring extending through the intermediate section from the upper plug to the neutron-absorbing material.

2. The control rod of claim 1 wherein the damping region is configured to be positioned above the guide tube during normal operation of the nuclear reactor fuel assembly.

3. The control rod of claim 1 wherein the damping region is configured to enter the guide tube only during a SCRAM operation.

4. The control rod of claim 1 wherein the damping region is configured to be positioned above the guide tube during normal operation of the nuclear reactor fuel assembly and to enter the guide tube only during a SCRAM operation of the nuclear reactor fuel assembly.

5. The control rod of claim 1 wherein the spring is coupled to the neutron-absorbing material.

6. The control rod of claim 1 wherein the neutron-absorbing material does not extend into the damping region.

7. The control rod of claim 1 wherein the diameter of the damping region continuously decreases from the first diameter at the upper damping location to the second diameter at the lower damping location.

8. The control rod of claim 1 wherein the cladding has a circular cross-sectional shape.

9. A control rod for inserting into a guide tube of a nuclear reactor fuel assembly, comprising:
an upper plug;
cladding coupled to the upper plug, wherein the cladding comprises a continuous wall defining—
an intermediate section extending from the upper plug, wherein the intermediate section includes a damping region having an upper damping location and a lower damping location farther from the upper plug than the upper damping location, wherein diameter of the damping region decreases from a first diameter at the upper damping location to a second diameter at the lower damping location, and wherein the damping region is configured to be positioned above the guide tube during normal operation of the nuclear reactor fuel assembly and to enter the guide tube only during a SCRAM operation of the nuclear reactor fuel assembly; and
a lower section extending downward from the damping region of the intermediate region;
a neutron-absorbing material positioned in the lower section; and
a spring extending through the intermediate section from the upper plug to the neutron-absorbing material.

10. The control of claim 9 wherein the upper plug defines an upper end of the control rod.

11. The control rod of claim 9 wherein the neutron-absorbing material does not extend into the damping region.

12. The control rod of claim 9 wherein the diameter linearly decreases from the first diameter at the upper damping location to the second diameter at the lower damping location.

13. A nuclear reactor system, comprising:
a nuclear core;
a guide tube extending at least partially into the nuclear core;
a control rod including—
an upper plug;
cladding coupled to the upper plug, wherein the cladding comprises a continuous wall defining—
an intermediate section extending from the upper plug, wherein the intermediate section includes a damping region having an upper damping location and a lower damping location farther from the upper plug than the upper damping location, and wherein diameter of the damping region decreases from a first diameter at the upper damping location to a second diameter at the lower damping location;
a lower section extending downward from the damping region of the intermediate section;
an active material positioned in the lower section and configured to control a fission rate of the nuclear core; and
a spring extending through the intermediate section from the upper plug to the neutron-absorbing material; and
a control rod drive mechanism (CRDM) coupled to the control rod and configured to move the control rod relative to the guide tube such that the damping region is positioned above the guide tube during normal operation of the nuclear reactor system and enters the guide tube only during a SCRAM operation of the nuclear reactor system.

14. The nuclear reactor system of claim 13 wherein the upper plug defines an upper end of the control rod.

15. The nuclear reactor system of claim 13 wherein the guide tube has a constant inner diameter that is greater than the first diameter.

16. The nuclear reactor system of claim 13 wherein the CRDM is configured to position the damping region above the guide tube outside the nuclear core during the normal operation of the nuclear reactor system.

17. The nuclear reactor system of claim 13, further comprising a coolant positioned to circulate through the guide tube without the use of pumps.

* * * * *